United States Patent
Barrowman

[11] Patent Number: 5,836,415
[45] Date of Patent: Nov. 17, 1998

[54] COMPOUND STEERING MECHANISM

[75] Inventor: Richard Barrowman, Hutton Brentwood, Great Britain

[73] Assignee: New Holland North America, Inc., New Holland, Pa.

[21] Appl. No.: 779,069

[22] Filed: Jan. 7, 1997

[30] Foreign Application Priority Data

Jan. 20, 1996 [GB] United Kingdom ................... 9601164

[51] Int. Cl.⁶ .................................................. B60K 17/30
[52] U.S. Cl. ............................................................ 180/266
[58] Field of Search .................................... 180/266, 267, 180/348, 378, 382, 421, 401; 280/111, 113, 126, 127

[56] References Cited

U.S. PATENT DOCUMENTS

| | | | |
|---|---|---|---|
| 3,063,173 | 11/1962 | Wardle | 180/266 |
| 3,783,966 | 1/1974 | Campbell et al. | 280/111 |
| 4,141,422 | 2/1979 | Hatz | 280/111 |
| 4,600,072 | 7/1986 | Krude | 180/348 |
| 5,046,577 | 9/1991 | Hurlburt | 180/266 |
| 5,447,320 | 9/1995 | Hurlburt | 280/97 |
| 5,447,321 | 9/1995 | Hurlburt et al. | 180/266 |
| 5,476,150 | 12/1995 | Hurlburt et al. | 180/266 |

FOREIGN PATENT DOCUMENTS 446043A  9/1991  European Pat. Off. .

*Primary Examiner*—Harold J. Tudor
*Assistant Examiner*—Theresa M. Wesson
*Attorney, Agent, or Firm*—Larry W. Miller; J. William Stader; Frank A. Seemar

[57] ABSTRACT

A compound steering mechanism for a vehicle includes a steering axle, steerable wheels mounted on the lateral ends of the axle for pivoting movement relative to the axle, and a mechanism for mounting the axle to the vehicle body to permit pivotal movement relative to the vehicle body about two orthogonal axes, the first axis being generally vertical and offset from the line of contact between the steerable wheels and the ground and the second axis extending generally fore-aft of the vehicle body. The mechanism for mounting the steering axle on the vehicle body is formed with an intermediate member, termed a skate, that is mounted on the vehicle body for pivoting about the said fore-aft axis and having a gimbal mount for supporting the steering axle in a manner to allow pivoting of the latter about the vertical axis.

8 Claims, 5 Drawing Sheets

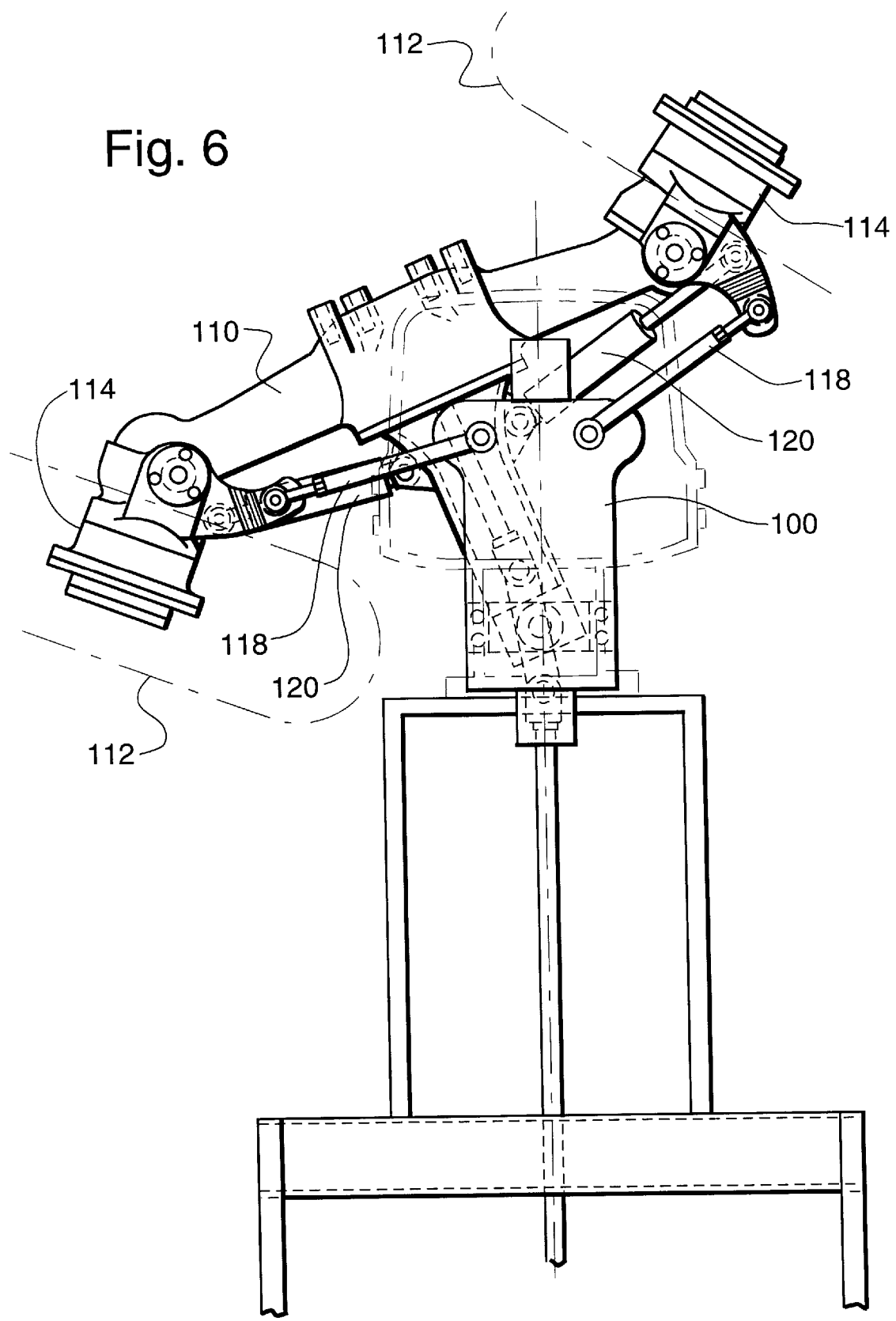

COMPOUND STEERING MECHANISM

BACKGROUND OF THE INVENTION

The present invention relates generally to off-road motor vehicles, such as tractors, and more particularly, to a compound steering mechanism permitting a decreased turning radius for the vehicle.

Tractors typically include a fixed axle through which primary driving power is transferred through fixed wheels rotatably mounted on opposing ends of the fixed axle, and a steering axle having pivotably mounted steerable wheels rotatably mounted on its opposite ends to support the chassis of the tractor above the ground. Commonly, supplemental driving power is also provided to the steerable ground engaging wheels. A steering mechanism controllable by the operator controls the pivotal movement of the steerable wheels relative to the steering axle.

The steering mechanism may typically incorporate a transversely disposed, horizontally extending hydraulic cylinder supported by the steering axle and connected to the opposing steerable wheels. This hydraulic cylinder affects pivotal movement of the steerable wheels about their respective pivotal connections to the steering axle by manipulating the pressures in the hydraulic cylinder to effect a transverse extension or retraction of the cylinder rod, causing a turning of the wheels.

Due to physical limitations relating to the range of movement of the steering mechanism and to the eventual interference between the steerable wheels and the chassis frame or the steering axle, the amount of pivotal movement of the steerable wheels relative to the steering axle is limited to a given turning angle. This maximum turning angle defines the minimum turning radius of the tractor for a given wheel base length and tread spacing. The selection of the length of the wheel base, i.e., the distance between the fixed axle and the steering axle, is a compromise between the need to minimise the turning radius and, therefore, minimise the wheel base length, and to maximise ride considerations which require longer wheel base lengths.

These conflicting wheel base requirements can be mitigated by a so-called compound steering mechanism incorporating a pivotable and laterally shiftable front axle that is movable in response to a corresponding steering movement of the steerable wheels, which will decrease the turning radius of the tractor for any given wheel base length.

In order to provide a further explanation of a compound steering mechanism, reference will now be made to FIGS. 1 and 2 of the accompanying drawings which show a plan view and a vertical section, respectively, of a known compound steering mechanism that has previously been proposed by the present applicants to improve the turning radius of a compact tractor.

As can best be seen from the plan view of FIG. 1, the front steering axle 10 is T-shaped and carries the steerable wheels 12 at the ends of its opposed arms. The rear end of the T-shaped housing of the axle 10 is mounted on a ball joint 16 to allow the entire axle to pivot about a vertical axis. The individual wheel hub assemblies 14 are connected by tie rods 18 to fixed points on the tractor body and hydraulic cylinders 20 controlled by the driver apply the necessary force to effect steering movements. FIG. 1 shows the steering mechanism in its position of maximum lock in one direction and it will be seen that the steering geometry ensures that the hydraulic cylinder acts to rotate the steerable wheels relative to the axle at the same time as it brings about a rotation and translation of the steering axle. This compound steering movement allows the steerable wheels to be turned to a greater angle without coming into contact with any part of the tractor.

The reason that a ball joint 16 is used is that in addition to the axle pivoting about a vertical axis, it is necessary for it to pivot about a fore-aft generally horizontal axis to allow the steerable wheels to move up and down relative to the tractor body when the tractor travels over uneven ground.

Because a ball joint 16 is used, it is necessary to take additional steps to prevent the entire front axle from pivoting about a horizontal transverse axis passing through the centre of the ball joint 16. Earlier proposed compound steering mechanisms provide a complex suspension supporting the front end of the steering axle on the tractor body but the illustrated mechanism uses instead a support link 22 that is connected at one end to the underside of the steering axle for pivoting movement about a vertical axis passing through the ball joint 16 and at the other end to the body of the tractor by a bearing 24 that allows rotation about a fore-aft axis passing through the ball 16.

Difficulty is encountered in the compound steering mechanism described above when trying to provide a stop to limit the extent that the axle may rotate relative to the tractor body about the longitudinal axis that passes through the ball joint 16 and the bearing 24. This is because all parts of the axle can move relative to the body of the tractor and if steering movements are attempted while the axle is in abutment with a conventional simple stop, then this system could give rise to loss of steering power and unacceptable levels of noise and wear. For these reasons, it was necessary to resort to stops of more complex design.

SUMMARY OF THE INVENTION

Accordingly, the present invention seeks to provide a compound steering mechanism in which pivoting steering movement of the steering axle about a vertical axis can be effected without noise and wear even when the steering axle has been pivoted to an end position about its fore-aft axis.

According to the present invention, there is provided a compound steering mechanism of a vehicle, comprising a steering axle, steerable wheels mounted on the lateral ends of the axle for pivoting movement relative to the axle, and means for mounting the axle to the vehicle body for pivoting movement relative to the vehicle body about two orthogonal axes, the first axis being generally vertical and offset from the line of contact between the steerable wheels and the ground and the second axis extending generally fore-aft of the vehicle body, characterised in that the means for mounting the steering axle on the vehicle body comprises an intermediate member, hereinafter termed a skate, that is mounted on the vehicle body for pivoting about the said fore-aft axis and having means for supporting the steering axle in a manner to allow pivoting of the latter about the said vertical axis.

The invention differs from the prior art proposal shown in FIGS. 1 and 2 in that the ball joint 16 is replaced by the skate which is itself pivotably mounted on the body for pivoting about the fore-aft axis and on which the steering axle is mounted for pivoting about the vertical axis. Because the skate does not rotate about a vertical axis with steering movements, it is possible to use abutments on the skate and the conventional abutments on the vehicle body to limit the pivoting movement of the axle about the fore-aft axis and there will be no relative movement between the abutting surfaces during steering movements to cause noise, wear or a reduction in steering power because of friction.

It is preferred also to anchor to the skate tie rods that are connected at their other ends to the hub assemblies of the steerable wheels. The lengths and positions of these tie rods dictate the steering geometry that determines the extent of rotation of the steerable wheels relative the steering axle for a given rotation and translation of the steering axle relative to the vehicle body. The mounting of these tie rods on the skate, rather than on the vehicle body, is advantageous in that the steering geometry is not affected by the rotation of the steering axle about the fore-aft axis. The vehicle therefore has no tendency to "bump steer" or "tilt steer", that is to say to deviate from its path when riding over a bump or when the steering axle is tilted about the fore-aft axis while driving over uneven ground.

A further advantage associated with the provision of a skate is that it provides a suitable position for mounting a steering position sensor. Such a sensor is required in many control system, for example to engage or disengage clutches in the transmission when the vehicle is turning. Hitherto, such sensors were mounted on the king pins of the steerable wheels but mounting a steering position sensor in this manner is undesirable for several reasons. The wheels operate in a very dirty environment and the sensor is prone to damage. The wires leading to the sensor are exposed and also easily damaged. Furthermore, because of the direct mounting of the sensor on the king pin, there is no linkage present that can act to amplify the degree of movement measured by the sensor.

All of the above disadvantages can be overcome by mounting a sensor to measure the rotation of the axle relative to the skate. Here, the sensor operates in a more protected environment and the wires leading to it can also be well protected. Furthermore, a linkage may now be used consisting of levers or a gear mechanism having a mechanical advantage to amplify the relative movement transmitted to the input shaft of the sensor.

A further advantage of the compound steering mechanism of the invention is that the steering axle, complete with the wheel hub assemblies, the hydraulic actuator, tie rods, and skate can be preassembled and correctly aligned in a suitable jig before being offered as a single unit to the body of the vehicle. This considerably simplifies and speeds up assembly.

These and other objects, features and advantages are accomplished according to the instant invention by a compound steering mechanism for a vehicle that includes a steering axle, steerable wheels mounted on the lateral ends of the axle for pivoting movement relative to the axle, and a mechanism for mounting the axle to the vehicle body to permit pivotal movement relative to the vehicle body about two orthogonal axes, the first axis being generally vertical and offset from the line of contact between the steerable wheels and the ground and the second axis extending generally fore-aft of the vehicle body. The mechanism for mounting the steering axle on the vehicle body is formed with an intermediate member, termed a skate, that is mounted on the vehicle body for pivoting about the said fore-aft axis and having a gimbal mount for supporting the steering axle in a manner to allow pivoting of the latter about the vertical axis.

BRIEF DESCRIPTION OF THE DRAWINGS

The invention will now be described further, by way of example, with reference to the accompanying drawings, wherein:

FIG. 6 is a top plan view of the compound steering, similar to that of FIG. 1, depicting the principles of the instant invention.

DETAILED DESCRIPTION OF THE PREFERRED EMBODIMENT

Figure 1:
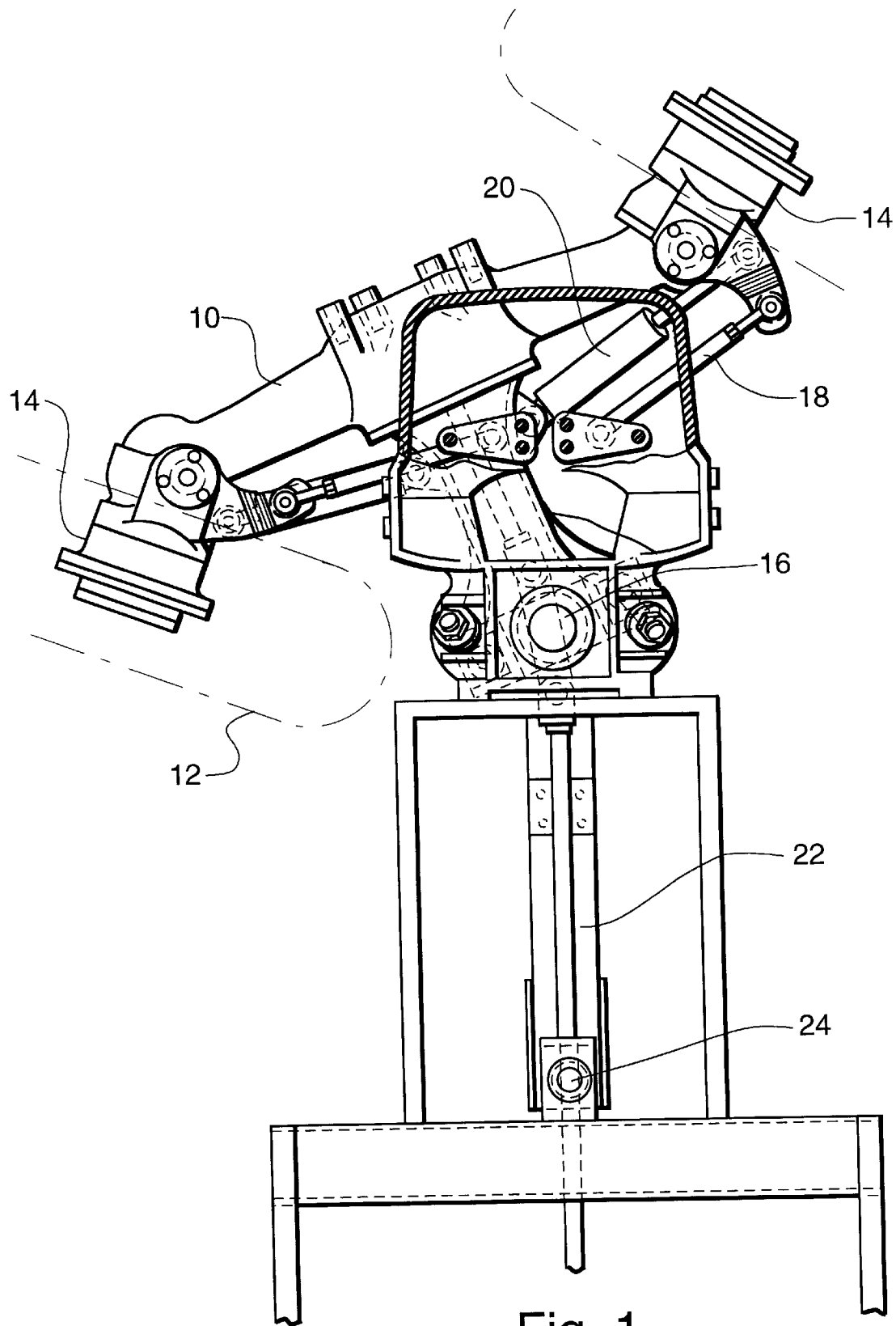
FIGS. 1 and 2 are a plan view and longitudinal section, respectively, of a known prior art compound steering mechanism.
Figure 2:
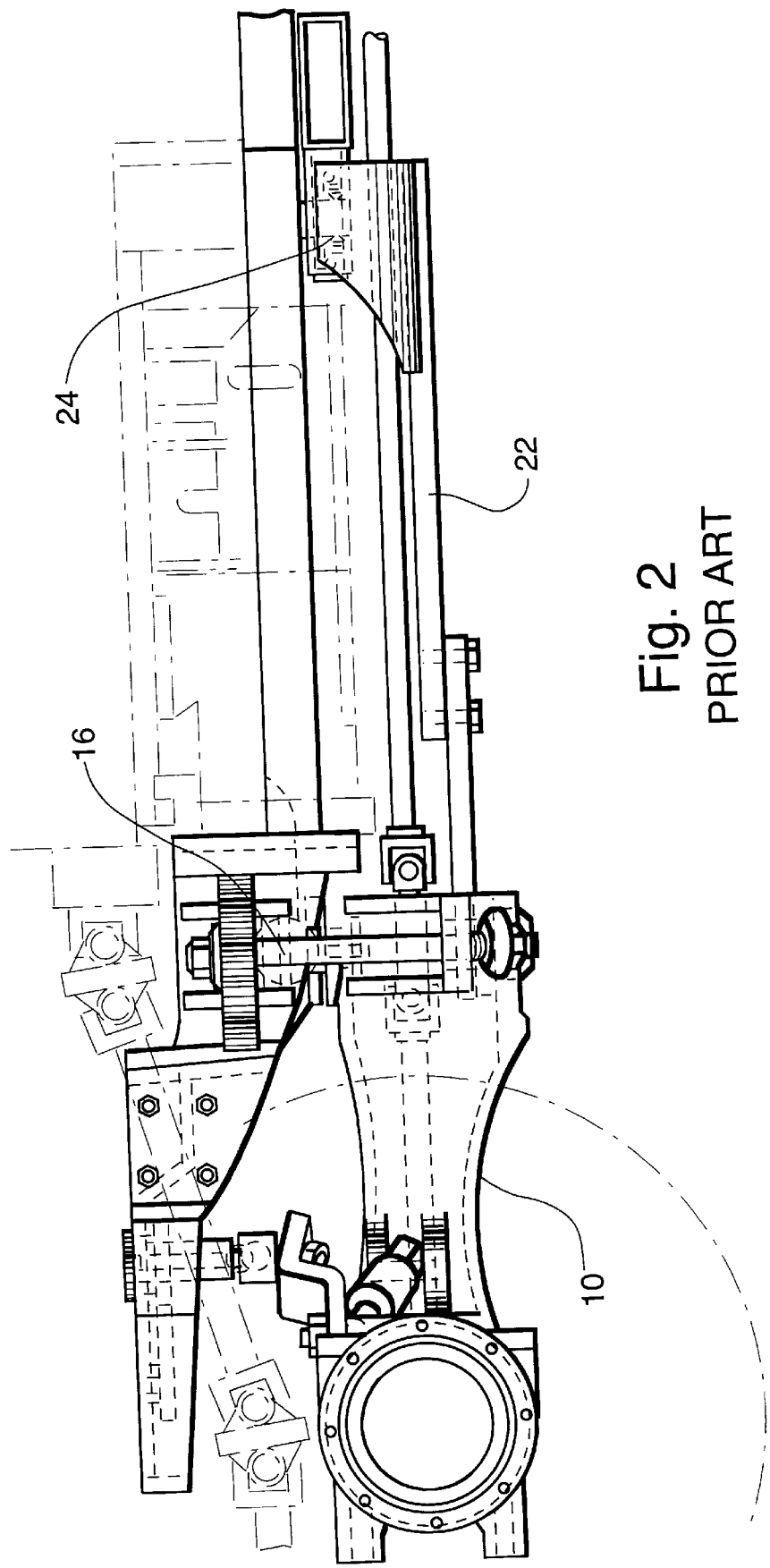
Figure 3:
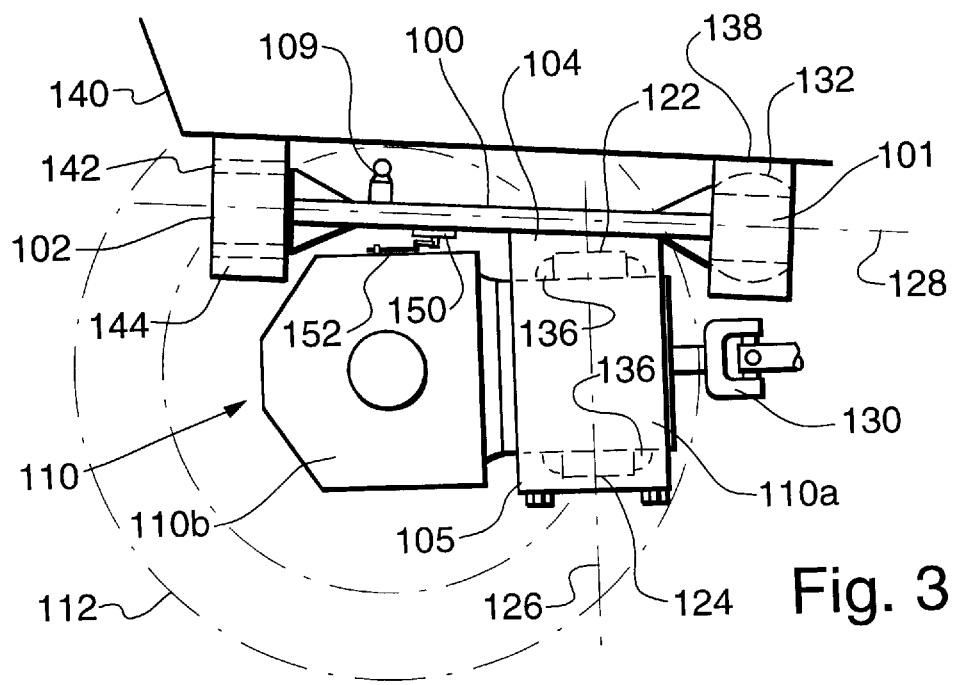
FIG. 3 is a view similar to that of FIG. 2 showing an embodiment of the invention in which the mounting of the steering axle on the main vehicle body is effected using a skate instead of a ball joint.

The prior art mechanism represented in FIGS. 1 and 2 are described in the Background of the Invention above. The present invention is best depicted with reference to FIGS. 3 and 4, keeping in mind the general environment thereof shown in FIGS. 1 and 2. FIG. 3 shows a front axle 110 that is generally similar to the axle 10 in FIG. 1 but to assist in better understanding the invention, much of the detail not relevant to the description of the present invention has been omitted.

The steering axle 110 is generally T-shaped when viewed in plan and has a differential housing 110b, a section 110a that extends rearwardly from the differential housing 110b and two lateral arms (not shown in FIG. 3) at the ends of which there are located pivotable hub assemblies 114 for the front steerable wheels 112. Hydraulic cylinders 120 are mounted in the same manner as the hydraulic cylinders 20 in FIG. 1 and act between the steering axle 110 and the hub assemblies 114 to effect steering movements of the steerable wheels and the steering axle.

Figure 4:
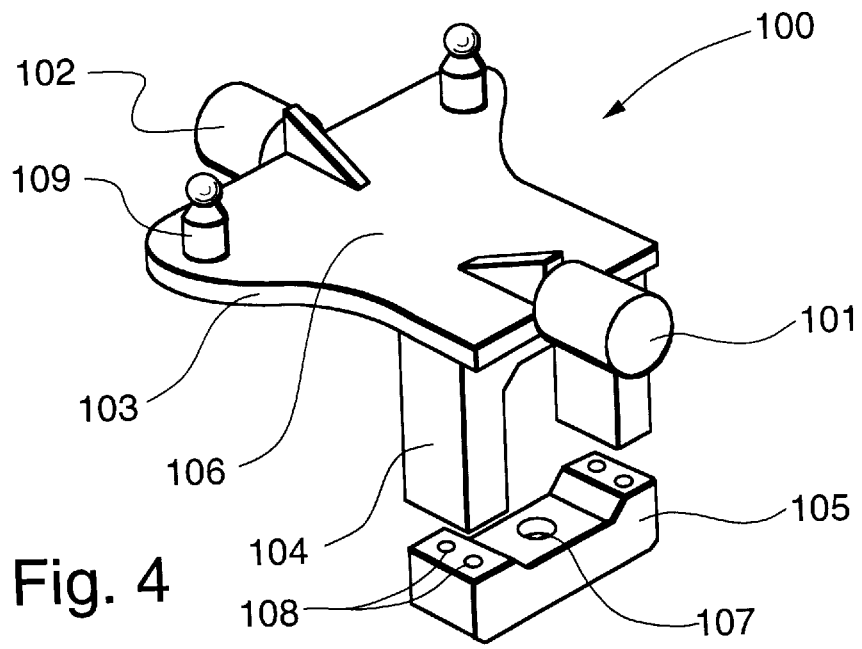
FIG. 4 is a perspective schematic view of the skate used in the embodiment shown in FIG. 3 as an intermediate mounting member to mount the steering axle on the vehicle body.

The embodiment of the invention differs from the prior art mechanism described above by reference to FIGS. 1 and 2 in that the ball joint 16 at the base of the T-shaped steering axle is replaced by an intermediate member or skate 100 shown in perspective in FIG. 4.

The skate 100 comprises a plate 103 with aligned pivot pins 101, 102 for mounting the plate 103 onto the main body of the tractor. A split gimbal mounting collar is provided on the underside of the skate 100, for receiving the base of the T-shaped steering axle 110.

The gimbal mounting collar is formed of an inverted U-shaped yoke 104 on the underside of the plate 103 and an end cap 105 that is secured to the ends of the limbs of the yoke 104 by means of bolts that pass through bores 108 in the end cap into threaded bores in the block 104. The yoke 104 and the end cap 105 have aligned bores 107 in which pivot pins 122, 124 projecting from the upper and lower surfaces of the steering axle 110 are journalled by means of part-spherical bearing shells 136. In this way, the steering axle 110 can pivot about the vertical axis 126 relative to the skate 100 to produce the desired compound steering movement.

The skate 100 is itself journalled by means of its pivot pins 101 and 102 onto a body member 140 that forms part of the body of the tractor. This allows the skate 100 to pivot together with the steering axle 110 about the fore-aft axis 128, which enables the wheels 112 at the opposite ends of the steering axle 110 to move up and down relative to the tractor body when the tractor is moving over uneven ground. The pivoting about the fore-aft axis 128 is limited in that surfaces 106 on the opposite sides of the plate 103 come into contact with adjustable end stops on the underside of the body member 140 of the tractor. The advantage offered by the invention is that even when the skate 100 has moved to a limit position against an end stop, the steering axle 110 can still rotate about the vertical axis 126 without the stop surfaces rubbing against one another.

Not only does the invention allow steering movements to be effected even while the axle is in abutment with its end stops but it does so without any need to modify the end stops. The stops that are used to abut against a non-compound steering axle can be used, without modification, to abut against the skate. Furthermore, the invention has no need to resort to other complex solutions that have hitherto been proposed, such as using end stops rollers movable along an arcuate track. Such solutions were not in any event entirely satisfactory for such reasons as cost and complexity.

It should be mentioned that terms such as vertical, horizontal and fore-aft are used herein only in a general sense. Of course, as the skate 100 pivots to a limit position, the axis 126 will cease to be vertical. Furthermore, as can be seen from FIG. 4, the fore-aft axis 128 is not quite horizontal but is slightly higher at the front than at the back of the tractor.

Figure 5:
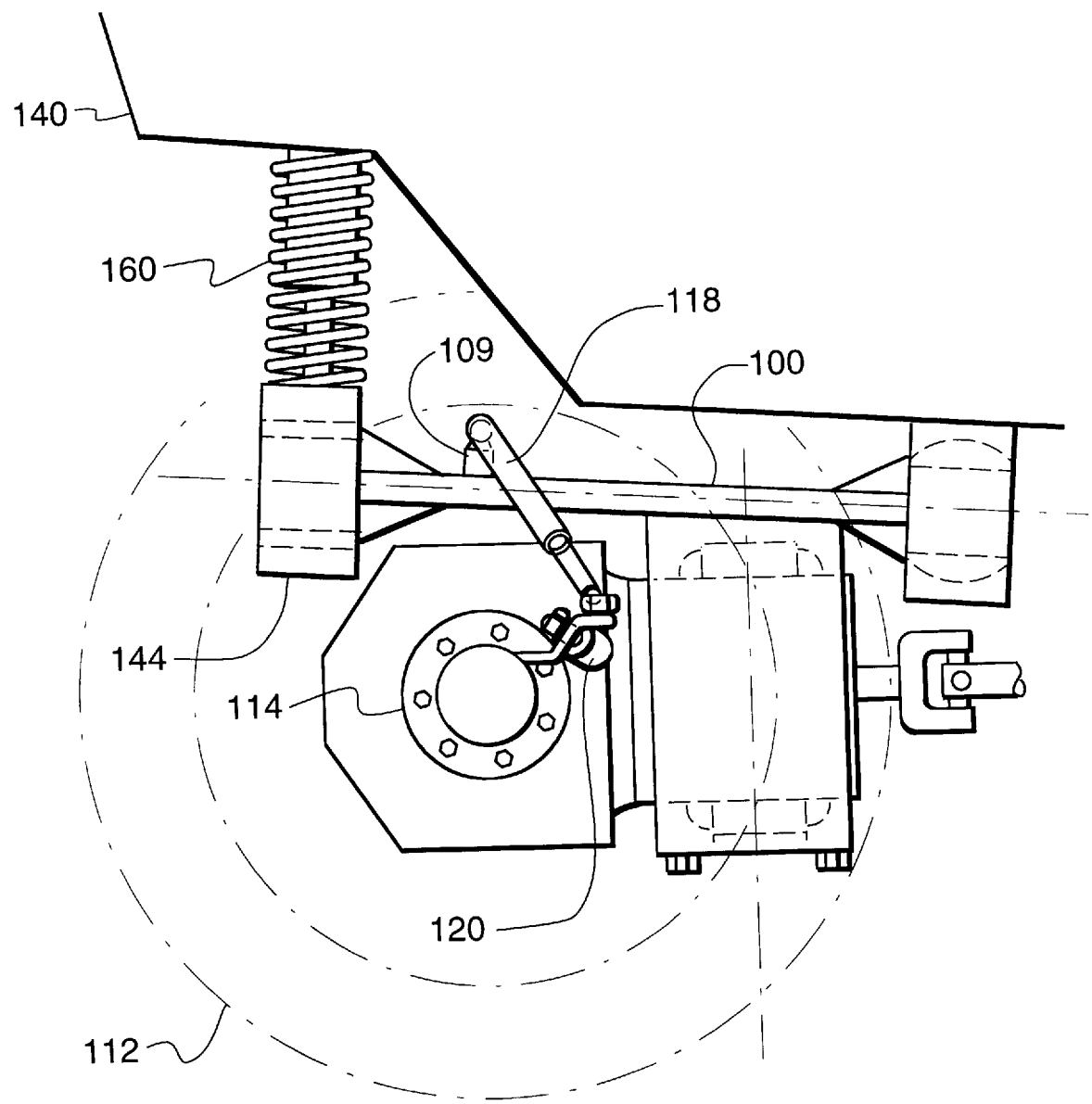
FIG. 5 is an enlarged cross-sectiona view of the compound steering mechanism, similar to that of FIG. 2, incorporating the principles of and depicting a side elevational view of the instant invention.

In the prior art steering mechanism of FIG. 1, the tie rods 18 are attached to the body of the tractor and, as a result, up and down movement of the wheels 12 alters the steering geometry and can cause the tractor to deviate from its path. In the described preferred embodiment of the invention, this problem of bump steer or tilt steer, is avoided by connecting the tie rods, by means of knuckle joints to the skate 100 rather than to the tractor body, posts 109 or other securing means being provided on the skate 100 for this purpose. Because the tie rods are connected to the skate 100 rather than to the body of the tractor, the knuckle joints at the ends of the tie rods are only required to permit pivoting movement of the tie rods in one plane, and this enables less expensive knuckle joints to be employed. The tie rods 118, as shown in FIGS. 5 and 6, serve the same purpose as the tie rods 18 in the prior art steering mechanism of FIG. 1. When movement of the skate 100 and the steering axle 110 takes place about the fore-aft axis 128, the tie rods will move in unison with the axle 110 and the skate 100, so that the steering geometry will not be affected.

In assembling tractors that do not have a compound steering mechanism, it is known to have the main body travel on a support block along a main assembly line. In a branch line, there are stacked complete steering axle assemblies that are bolted directly to the body of the tractor in one assembly step. After fitting of the steering axle, the tractor can be raised off its support block and rest on its own wheels for the remainder of its travel along the assembly line.

If such an assembly technique is used in the case of compound steering system of FIGS. 1 and 2, then, because the tie rods 18 are connected at one end to the axle subassembly and at the other to the body of the tractor, the setting of the length of the tie rods and the alignment of the steering geometry can only be carried out after fitting of the steering axle to the tractor body. Steering alignment is therefore difficult to achieve in mass production as it had to be performed while the tractor is moving along the conveyor of the main assembly line.

The present invention offers the advantage that the steering axle 110, the skate 100, the skate bearings 138,144, the body part 140 and the tie rods can all be connected to one another as a subassembly. The steering geometry can be correctly set up by placing the subassembly in a suitable jig away from the main assembly line. The compound steering axle subassemblies can then be bolted to the bodies of the tractors in the same way as with non-compound steering axles. A particularly advantage that results from this is that a compound steering subassembly may be directly substituted for a conventional steering axle assembly without major modification to the tractor body, thereby enabling retrofitting of compound steering to tractors of existing design without the need for major modification to their assembly lines.

The described steering axle 110 is a driven axle for a tractor with four wheel drive. To permit drive to be applied to the axle despite pivoting movement about the axis 126, a universal joint 130 is provided in the propeller shaft leading from the main transmission to the steering axle 110. It will however be clear that the invention can also be applied to vehicles that are driven only by their rear wheels and that the steering axle need not therefore transmit drive to the front wheels.

It would be possible to mount both the pivot pins 101 and 102 on the ends of the skate 100 in pillow blocks that are firmly fixed relative to the tractor body 140, in which case there would be no springs and dampers acting between the tractor body and the steering axle and all movements of the steering axle 110 in a vertical direction would be directly transmitted to the body of the tractor.

In the illustrated embodiment of the invention, however, the pivot pin 101 is mounted in a pillow block 138 secured to the body 140 of the tractor by means of a spherical bearing shell 132 that allows the skate 100 to pivot about an axis normal to the plane of the drawing and passing through the centre of the shell 132. At the other end, the pivot pin 102 is mounted by means of a cylindrical shell 142 in a pillow block 144 that is not secured permanently to the body 140 but instead forms part of a support that can pivot relative to the tractor body about the axis of the bearing shell 132 and that is connected to the body 140 by springs and dampers. 160, as best seen in FIG. 5. The effect of the suspension will be to absorb part of the shock transmitted from the steering axle 110 to the body of the tractor when the tractor is moving over uneven ground.

A steering position sensor 150 in the form of a potentiometer is mounted on the skate 100. The input shaft of the potentiometer is connected by means of a mechanical linkage 152 to the axle 110 so that as the axle 110 pivots relative to the skate 100, the resistance value of the sensor varies to provide an output signal indicative of the direction in which the tractor is being steered. Hitherto such a sensor was mounted on the king pins of the hub assemblies 114 but there the sensor is not well protected. The mechanical linkage 152 can also act to magnify the relative movement, thereby increasing the sensor sensitivity.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

What is claimed is:

1. In a compound steering mechanism for a vehicle having a vehicle body, said compound steering mechanism including a steering axle, steerable wheels contacting the ground to support the vehicle for mobile movement over the ground and being mounted on the lateral ends of the axle for pivoting movement relative to the axle, and means for mounting the axle to the vehicle body for pivoting movement relative to the vehicle body about two orthogonal axes, the first said axis being generally vertical and offset from a line of contact between the steerable wheels and the ground and the second said axis extending generally fore-aft of the vehicle body, the improvement comprising:

said means for mounting the steering axle on the vehicle body including a skate forming an intermediate member mounted on the vehicle body for pivoting about the said fore-aft axis, said skate having means for supporting the steering axle in a manner to allow pivoting of said steering axle about said first axis.

2. The compound steering mechanism of claim 1 wherein stop surfaces are provided on the skate that abut against the vehicle body to limit the pivoting movement of the skate and the steering axle about the said second axis.

3. The compound steering mechanism of claim 2 wherein tie rods for causing the pivoting of the steering axle to occur in synchronism with the pivoting of steerable wheel hub assemblies relative to the steering axle are connected between the hub assemblies of the steerable wheels and the skate.

4. The compound steering mechanism of claim 3 wherein an electrical steering sensor is provided to sense the relative position of the skate and the steering axle.

5. The compound steering mechanism of claim 4 wherein the sensor is a potentiometer mounted on the skate and having an input shaft connected by a mechanical linkage to a point on the steering axle.

6. The compound steering mechanism of claim 3 wherein the skate comprises a plate, aligned pivot pins projecting from the plate for mounting the skate on the body of the tractor for pivoting movement about the fore-aft axis of the tractor and a gimbal mounting collar depending from an under surface of the plate for receiving therein the steering axle in a manner to permit pivoting movement of the axle about the vertical axis.

7. The compound steering mechanism of claim 6 wherein the pivot pins at both ends of the skate are mounted in cylindrical bearings that are fixed relative to the body of the vehicle.

8. The compound steering mechanism of claim 6 wherein a rearward projecting pivot pin of the skate is mounted in a spherical bearing that is fixed relative to the body of the vehicle and a forward projecting pivot pin is mounted in a cylindrical bearing that moves vertically in relation to the vehicle body and is suspended from the vehicle body by means of damper means.

* * * * *